May 22, 1923.

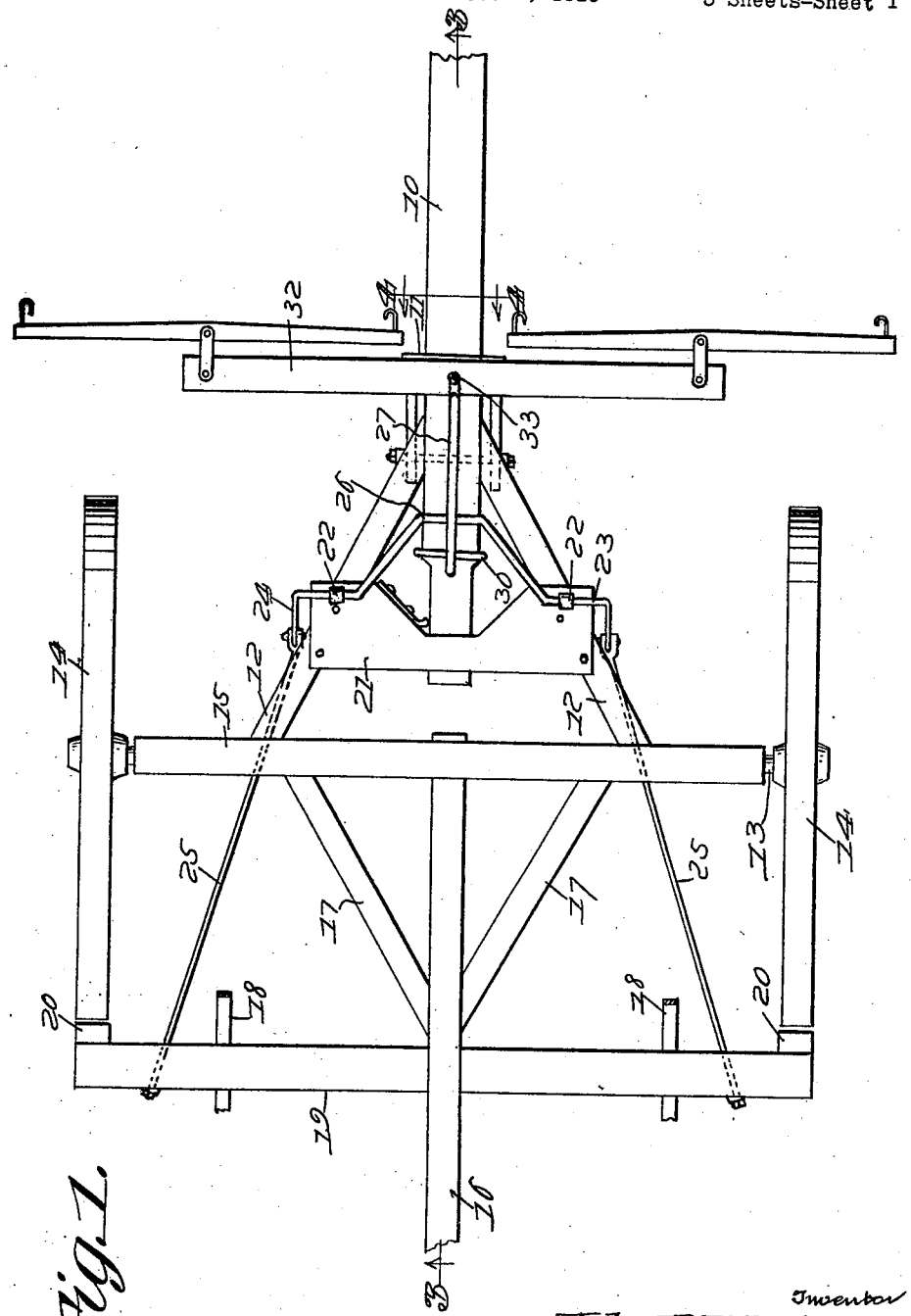

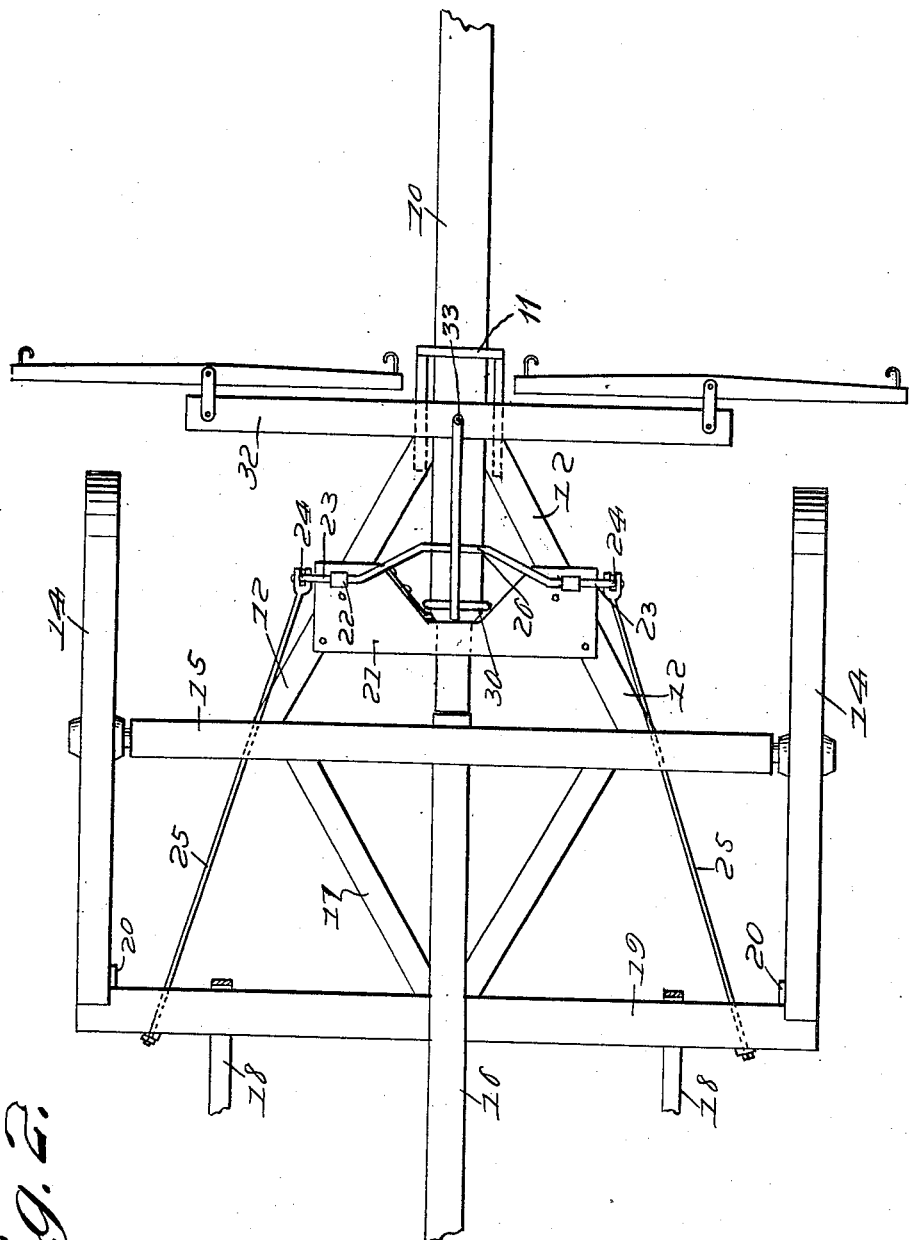

J. D. WORKMAN 1,456,416

AUTOMATIC VEHICLE BRAKE

Filed Dec. 4, 1919

Inventor
John D. Workman,
By
Attorney

Patented May 22, 1923.

1,456,416

UNITED STATES PATENT OFFICE.

JOHN D. WORKMAN, OF ELLIOTTSVILLE, PENNSYLVANIA.

AUTOMATIC VEHICLE BRAKE.

Application filed December 4, 1919. Serial No. 342,453.

*To all whom it may concern:*

Be it known that JOHN D. WORKMAN, a citizen of the United States of America, residing at Elliottsville, in the county of Fayette and State of Pennsylvania, has invented new and useful Improvements in Automatic Vehicle Brakes, of which the following is a specification.

The object of the invention is to provide a brake mechanism for use in connection with farm wagons and other vehicles whereby in descending a grade or in offering resistance to forward movement either by checking the draught team or reducing the speed of the tractor or traction mechanism, brakes will be automatically applied to the wheels of the vehicle or trucks in rear of the team or tractor to relieve the strain on the team or tractor and prevent buckling, such mechanism being of a construction which will involve the release of the brake mechanism when forward draught is applied to the traction means as when traversing level ground or in ascending a grade, and with these objects in view the invention consists in a construction and combination of parts of which a preferred embodiment is shown in the accompanying drawing, wherein:

Figure 1 is a plan view of the brake mechanism applied in the operative position to a vehicle running gear wherein a draught pole or tongue is employed as the means of communicating forward motion to the vehicle, the parts being shown in the positions which they occupy when traversing a level surface or in ascending a grade or when the traction team or means is subjected to a forward strain.

Figure 2 is a similar view of the mechanism showing the positions which the parts assume when a backward strain or resistance is offered to the tongue or equivalent draught mechanism as in descending a grade.

Figure 4:
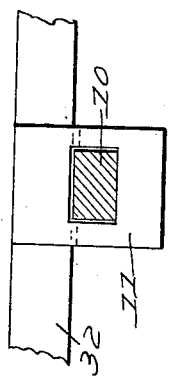
Figure 4 is a transverse sectional view on the plane indicated by the line 4—4 of Figure 1.
Figure 3:
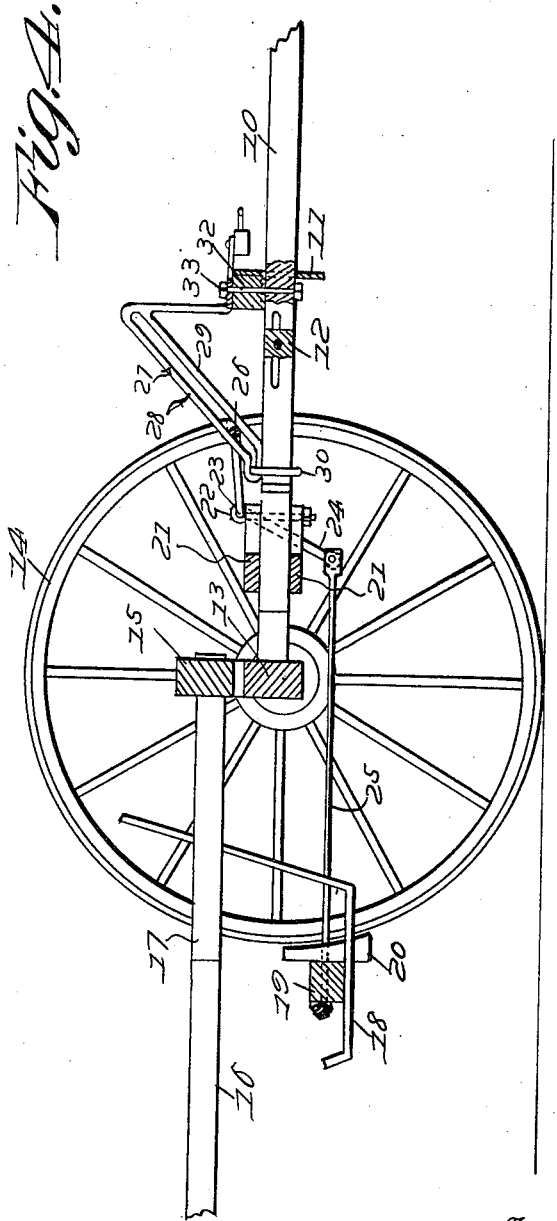
Figure 3 is a longitudinal sectional view on the plane indicated by the line 3—3 of Figure 1.

In the illustrated embodiment of the invention there is employed a draught element consisting of a tongue 10 which is mounted for forward and rearward sliding movement in a guide 11 supported by hounds 12 extending as in the ordinary construction of a wagon gear, to the front axle 13 upon which are mounted the front or steering wheels 14, said axle being surmounted as in the ordinary construction, by a bolster 15 connected with the front end of the reach pole 16 to which may extend braces 17 and mounted upon suitable guides 18 in rear of the wheels is a rubber or brake bar 19 carrying the rubber or brake blocks 20 for engagement with the surfaces of said wheels when forward movement is imparted to said rubber or brake beam.

Carried by the hounds in advance of the front axle are transverse plates 21, upon the upper of which, by means of bearing eyes 22 are mounted the spindle portions 23 of a crank shaft having arms 24, connected by draught rods 25 with said rubber or brake beam 19, while the intermediate arched or cranked portion of the said shaft, as indicated at 26, is engaged by a clevis 27 mounted upon the draught element 10 and having upper and lower cam elements 28 and 29 for imparting downward and upward movement respectively to said looped portion of the crank shaft to swing the latter in directions to cause the release or application of the brakes. Said clevis is preferably provided at its rear end with a guide ring 30 embracing the draught element or tongue of which the rear end extends between the guide plates 21 and carries the double tree 32 held in place upon the draught element by means of a hammer bolt 33 arranged at the front end of the clevis. As the team or traction means exerts rearward pressure upon the draught element 10 the latter is moved rearwardly from the position indicated in Figure 1 to that indicated in Figure 2, carrying with it the clevis and causing the lower cam 29 to raise the arched or intermediate portion of the crank shaft and thus cause the application of the brake blocks to the wheels to resist the forward rotation thereof, whereas obviously the opposite movement of the draught element due to forward strain of the team or traction means will cause the depression of the arched portion of the crank shaft by the contact of the cam 28 therewith to release the brakes. Therefore whereas the team or traction means will be aided in resisting the forward movement of the vehicle in descending a grade, without necessitating any effort or attention on the part of a driver, the resistance will be removed as soon as the level ground or an upgrade is reached and the position of the draught element is altered by the application of forward strain thereto.

What is claimed is:

An automatic brake mechanism for vehicles having a draught gear consisting of a front axle, hounds extending forwardly from said axle, a brake beam extending transversely in rear of said axle, plates carried by the said hounds in advance of the front axle, a guide mounted upon the hounds, a draught element slidably mounted in said guide and extending rearwardly between said plates, a double tree, a clevis having a guide ring engaging the draught element and provided at its forward end with a hammer bolt engaging said double tree and draught element, a crank shaft having spindle portions and an intermediate arched portion of which the former are mounted upon one of said plates and provided with terminal arms connected with said brake beam, and cams carried by the clevis in engagement with the intermediate arched portion of the crank shaft and disposed in inclined relation to the path of the draught element for imparting swinging movement in opposite directions to said crank shaft.

In testimony whereof he affixes his signature.

JOHN D. WORKMAN.